(12) United States Patent
Hamajima et al.

(10) Patent No.: US 7,425,233 B2
(45) Date of Patent: *Sep. 16, 2008

(54) CYAN INK FOR INK-JET RECORDING

(75) Inventors: Tomoyo Hamajima, Nagoya (JP); Shunichi Higashiyama, Yokkaichi (JP); Kazuma Goto, Nagoya (JP); Narumi Koga, Nagoya (JP); Yasuhiro Taga, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/673,932

(22) Filed: Feb. 12, 2007

(65) Prior Publication Data

US 2007/0186808 A1 Aug. 16, 2007

(30) Foreign Application Priority Data

| Feb. 16, 2006 | (JP) | ............................ 2006-038752 |
| Feb. 16, 2006 | (JP) | ............................ 2006-038756 |
| Feb. 16, 2006 | (JP) | ............................ 2006-038758 |

(51) Int. Cl.
*C09D 11/02* (2006.01)

(52) U.S. Cl. ................................. 106/31.49

(58) Field of Classification Search ............. 106/31.49
See application file for complete search history.

(56) References Cited

U.S. PATENT DOCUMENTS

| 6,365,720 | B1 | 4/2002 | Schacht et al. |
| 6,444,807 | B1 | 9/2002 | Wolleb et al. |
| 6,495,250 | B1 | 12/2002 | Schacht et al. |
| 7,297,198 | B1 * | 11/2007 | Taga et al. ............... 106/31.49 |
| 7,303,617 | B1 * | 12/2007 | Taga et al. ............... 106/31.49 |
| 7,303,618 | B1 * | 12/2007 | Taga et al. ............... 106/31.49 |
| 2003/0105321 | A1 | 6/2003 | Wolleb et al. |
| 2005/0104944 | A1 | 5/2005 | Robertson et al. |
| 2005/0215773 | A1 | 9/2005 | Tateishi et al. |
| 2006/0016026 | A1 | 1/2006 | Tateishi et al. |
| 2007/0186806 | A1 * | 8/2007 | Goto et al. ............... 106/31.48 |

FOREIGN PATENT DOCUMENTS

| JP | 03-103484 | 4/1991 |
| JP | 2003-213168 | 7/2003 |
| JP | 2000-303009 | 10/2003 |
| JP | 2004-002670 | 8/2004 |
| JP | 2005-075778 | 3/2005 |
| JP | 2005-520029 | 7/2005 |
| JP | 2006-028450 | 2/2006 |
| WO | 03-016498 | 2/2003 |

* cited by examiner

*Primary Examiner*—Helene Klemanski
(74) *Attorney, Agent, or Firm*—Banner & Witcoff, Ltd

(57) ABSTRACT

A cyan ink for ink-jet recording contains a coloring agent, water and a water soluble organic solvent. Different types of dyes are employed as the coloring agent. In particular, a dye represented by the general formula (1) is used together with at least one dye selected from the group consisting of a dye represented by the general formula (2), a dye represented by the general formula (3) and C. I. Direct Blue 86. In the formulas, Pc(Cu) is a copper phthalocyanine nucleus.

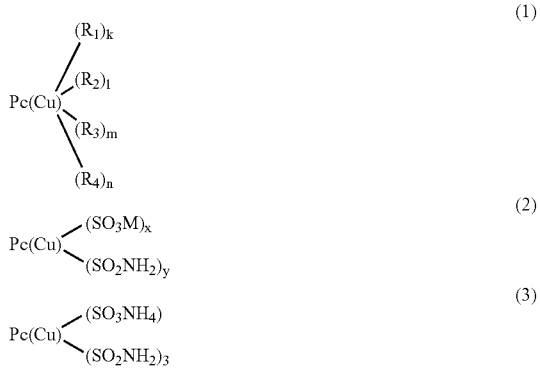

14 Claims, No Drawings

CYAN INK FOR INK-JET RECORDING

BACKGROUND OF THE INVENTION

1. Field of the Invention

The present invention relates to a cyan ink for ink-jet recording.

2. Description of the Related Art

In an ink-jet recording method, a cyan ink is required in order to form a full-color image. Generally known examples of the cyan dye used as a coloring agent in such a cyan ink include C. I. Acid Blue 74, C. I. Acid Blue 9 and the like. However, since these cyan dyes have very poor light fastness, copper phthalocyanine-based dyes such as C. I. Direct Blue 86, C. I. Direct Blue 199 and the like are widely employed as the coloring agent of the cyan ink used in commercial ink-jet inks. These common copper phthalocyanine-based dyes are characterized by having better light fastness than magenta dyes and yellow dyes. However, these phthalocyanine-based dyes are prone to fading or discoloring due to contact with ozone. Thus a problem exists in that discoloration or optical density reduction occurs in an ink-jet recorded image recorded with these dyes. In view of the above, a copper phthalocyanine-based dye has been proposed which has improved ozone resistance (see Japanese Patent Application Laid-Open No. Hei 03-103484).

However, even when such a copper phthalocyanine-based dye having improved ozone resistance is employed, a cyan ink for ink-jet recording having excellent hue, excellent light fastness, ozone resistance and ejection stability has not been realized up until now.

SUMMARY OF THE INVENTION

It is an object of the present invention to provide a cyan ink for ink-jet recording which has excellent storage stability for maintaining satisfactory ejection stability over long term use and excellent color developing properties, and is capable of imparting good light fastness and ozone resistance to a recorded material recorded with the ink.

The present inventors have prepared a cyan ink for ink-jet recording using different types of cyan dyes. Specifically, a specific copper phthalocyanine-based dye which exhibits excellent ozone resistance but has poor solubility in water and insufficient color developing properties has been used together with another specific copper phthalocyanine-based dye which has good solubility in water and excellent color developing properties but exhibits poor ozone resistance. In this case, the inventors have found that the favorable characteristics of the two types of cyan dyes are not lost and that the level of these characteristics is not given by the arithmetic mean thereof. Rather, the inventors have unexpectedly found that these favorable characteristics are maintained. Therefore, the present invention has been completed.

Accordingly, the present invention provides a cyan ink for ink-jet recording, comprising a coloring agent, water and a water soluble organic solvent, wherein the coloring agent contains a dye (1) represented by the general formula (1) and at least one dye selected from the group consisting of a dye (2) represented by the general formula (2), a dye (3) represented by the general formula (3) and C. I. Direct Blue 86,

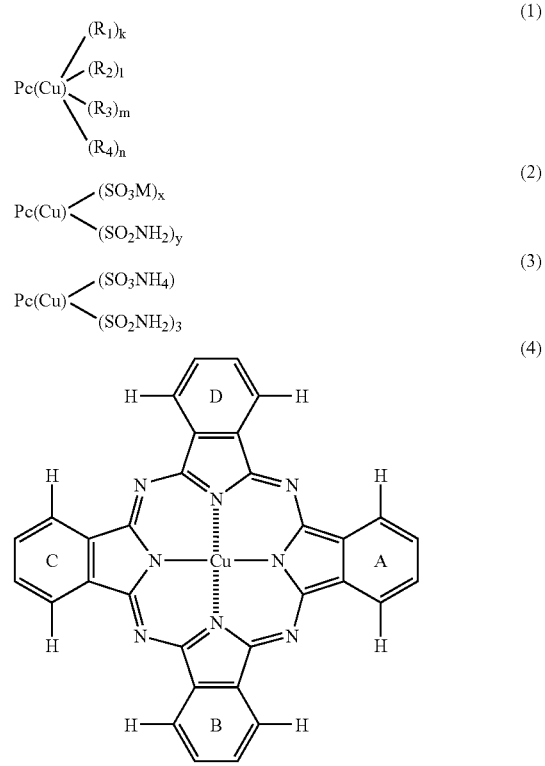

wherein, in the general formulas (1) to (3), Pc(Cu) represents a copper phthalocyanine nucleus represented by the general formula (4), wherein, in the general formula (1), k is a number satisfying $0<k<8$; l is a number satisfying $0<l<8$; m is a number satisfying $0\leq m<8$; n is a number satisfying $0\leq n<8$; k, l, m and n satisfy $4\leq k+l+m+n\leq 8$; $R_1$, $R_2$, $R_3$ and $R_4$ each independently represent a substituent selected from $—SO_2—R_a$, $—SO_2NR_bR_c$ and $—CO_2—R_a$, provided that $R_1$, $R_2$, $R_3$ and $R_4$ are not simultaneously the same, that at least one of $R_1$, $R_2$, $R_3$ and $R_4$ has an ionic hydrophilic group as a substituent, and that at least one or more of $R_1$, $R_2$, $R_3$ and $R_4$ is present on each of four benzene rings A, B, C and D of the copper phthalocyanine nucleus represented by the general formula (4), wherein $R_a$ represents a substituted or unsubstituted alkyl group; $R_b$ represents a hydrogen atom, or a substituted or unsubstituted alkyl group; and $R_c$ represents a substituted or unsubstituted alkyl group, wherein, in the general formulas (2) and (3), each of an $SO_3M$ group, an $SO_2NH_2$ group and an $SO_3NH_4$ group is present on any of the four benzene rings A, B, C and D of the copper phthalocyanine nucleus represented by the general formula (4); M represents a monovalent metal cation selected from a lithium ion, a sodium ion and a potassium ion; x is a number satisfying $0<x<4$; y is a number satisfying $0<y<4$; and x and y satisfy $2\leq x+y\leq 5$.

In the cyan ink for ink-jet recording of the present invention, two specific types of phthalocyanine-based dyes are employed as the cyan dyes of the cyan ink for ink-jet recording. Thus, excellent color developing properties and ejection stability can be imparted to the cyan ink, and excellent light fastness and ozone resistance can be imparted to an ink-jet recorded material recorded with the ink.

DETAILED DESCRIPTION OF THE PREFERRED EMBODIMENTS

The cyan ink for ink-jet recording of the present invention is characterized in that it contains water, a water soluble organic solvent and, as a coloring agent, the dye (1) represented by the above-described general formula (1) and at least one dye selected from the group consisting of a dye (2) represented by the general formula (2), a dye (3) represented by the general formula (3) and C. I. Direct Blue 86. The characteristics of each of the dyes themselves and the advantages the combined use of these dyes provides are described below.

The dye (1) represented by the general formula (1) exhibits excellent ozone resistance as the dye molecules have strong association properties. Conversely, however, because the degree of association of the dye molecules is large, the cyan dye (1) has a drawback in that its solubility in water are poor. Therefore, when the dye (1) alone is employed as the cyan dye of a cyan ink for ink-jet recording, there is concern about the long-term storage stability and evaporativity of the ink because the solubility of the dye in water are poor. In particular, it is feared that, if a dye having poor solubility in water is employed in an ink, the viscosity of this ink is increased even when a small amount of water is evaporated. When the viscosity of the ink is too high, passage resistance in an ink-jet head is increased, and thus difficulties arise in that the ink is not stably ejected. Furthermore, when a precipitate is formed in the ink, difficulties arise in that the ink is not stably ejected since, for example, the precipitate may cause clogging of the nozzles and may adhere to the surface of the nozzles, causing misdirection of the ink. When the amount of the dye added is decreased to solve the evaporation problem, another problem arises in that the color developing properties of the ink deteriorate.

Conversely, each of the dye (2) represented by the general formula (2), the dye (3) represented by the general formula (3) and C. I. Direct Blue 86 has poorer ozone resistance than the dye (1), but has good solubility in water, and excellent vividness and color developing properties.

Generally, when two types of dyes having different characteristics are employed together, it is conceivable that the favorable characteristics of the dyes are lost, or that at least the level of these favorable characteristics is given by the arithmetic mean thereof even when these characteristics are not lost. However, when the dye (1) is employed together with at least one dye selected from the group consisting of the dye (2), the dye (3) and C. I. Direct Blue 86, the advantage is unexpectedly obtained that the favorable characteristics of each one of the dyes are maintained.

The cyan ink for ink-jet recording of the present invention contains the dye (1) and at least one dye selected from the group consisting of the dye (2), the dye (3) and C. I. Direct Blue 86 in a ratio by weight usually in the range of about 70:30 to about 95:5 and often in the range of about 85:15 to about 95:5. When the ratio between the amounts of the dyes falls within the above listed range, the favorable characteristics of each of the dyes can be fully utilized in a well-balanced manner.

The total amount of the dye (1) and at least one dye selected from the group consisting of the dye (2), the dye (3) and C. I. Direct Blue 86 in the cyan ink for ink-jet recording is appropriately determined depending on the performance and required characteristics of the ink. The total amount of the dyes based on the total amount of the cyan ink for ink-jet recording is usually in the range of about 1 wt % to about 5 wt % and often in the range of about 3 wt % to about 5 wt %.

Furthermore, in addition to the dye (1) and at least one or two dye(s) selected from the group consisting of the dye (2), the dye (3) and C. I. Direct Blue 86, or in addition to the dye (1) and all of these three dyes, another dye may also be employed within the range which does not impair the positive effect of the invention.

The substituents in the general formula of each of the dyes (1), (2) and (3) will now be described. First, a description will be given of substituents $R_1$ to $R_4$, Pc(Cu), k, l, m and n in the general formula (1) of the dye (1).

As described above, Pc(Cu) represents the copper phthalocyanine nucleus represented by the general formula (4). $R_1$, $R_2$, $R_3$ and $R_4$ each independently represent a substituent selected from $-SO_2-R_a$, $-SO_2NR_bR_c$ and $-CO_2-R_a$, provided that $R_1$, $R_2$, $R_3$ and $R_4$ are not simultaneously the same. Here, at least one of $R_1$, $R_2$, $R_3$ and $R_4$ has an ionic hydrophilic group as a substituent. Furthermore, at least one or more of $R_1$, $R_2$, $R_3$ and $R_4$ is present on each of the four benzene rings A, B, C and D of the copper phthalocyanine nucleus represented by the general formula (4). $R_a$ represents a substituted or unsubstituted alkyl group. $R_b$ represents a hydrogen atom, or a substituted or unsubstituted alkyl group. Furthermore, $R_c$ represents a substituted or unsubstituted alkyl group. k is a number satisfying 0<k<8, and l is a number satisfying 0<l<8. m is a number satisfying 0≦m<8, and n is a number satisfying 0≦n<8. In addition, k, l, m and n satisfy 4≦k+l+m+n≦8.

Examples of the substituted or unsubstituted alkyl groups $R_a$, $R_b$ and $R_c$ in the general formula (1) include, but not limited to, linear, branched and alicyclic alkyl groups having 1 to 12 carbon atoms. Particularly, a branched alkyl group is preferable because the solubility of the dye and the stability of the ink are improved. Particularly preferably, the alkyl group has an asymmetric carbon atom (in this case a racemic body is used).

Examples of the substituent of the substituted alkyl groups $R_a$, $R_b$ and $R_c$ include, but not limited to, a linear or branched alkyl group having 1 to 12 carbon atoms, a linear or branched aralkyl group having 7 to 18 carbon atoms, a linear or branched alkenyl group having 2 to 12 carbon atoms, a linear or branched alkynyl group having 2 to 12 carbon atoms, a linear or branched cycloalkyl group having 3 to 12 carbon atoms, a linear or branched cycloalkenyl group having 3 to 12 carbon atoms (among the above groups, branched chain groups are preferable in terms of improving the solubility of the dye and the stability of the ink, and groups having an asymmetric carbon atom are particularly preferable. Examples of such groups include, but not limited to, methyl, ethyl, propyl, isopropyl, sec-butyl, tert-butyl, 2-ethylhexyl, 2-methylsulfonylethyl, 3-phenoxypropyl, trifluoromethyl and cyclopentyl), a halogen atom (for example, a chlorine atom or a bromine atom), an aryl group (for example, phenyl, 4-tert-butylphenyl or 2,4-di-tert-amylphenyl), a heterocyclic group (for example, imidazolyl, pyrazolyl, triazolyl, 2-furil, 2-thienyl, 2-pyrimidinyl or 2-benzothiazolyl), a cyano group, a hydroxyl group, a nitro group, a carboxy group, an amino group, an alkyloxy group (for example, methoxy, ethoxy, 2-methoxyethoxy or 2-methanesulfonylethoxy), an aryloxy group (for example, phenoxy, 2-methylphenoxy, 4-tert-butylphenoxy, 3-nitrophenoxy, 3-tert-butyloxycarbamoylphenoxy or 3-methoxycarbamoyl), an acylamino group (for example, acetamide, benzamide or 4-(3-tert-butyl-4-hydroxyphenoxy) butanamide), an alkylamino group (for example, methylamino, butylamino, diethylamino or methylbutylamino), an anilino group (for example, phenylamino or 2-chloroanilino), a ureide group (for example, phenylureide, methylureide or N,N-dibutylureide), a sulfamoylamino group (for example, N,N-dipropylsulfamoylamino), an alkylthio group (for example, methylthio, octylthio or 2-phenoxyethylthio), an arylthio group (for example, phenylthio, 2-butoxy-5-tert-octylphenylthio or 2-carboxyphenylthio), an alkyloxycarbonylamino group (for example, methoxycarbonylamino), a sulfonamide group (for example, such as methanesulfonamide, benzenesulfonamide or p-toluenesulfonamide), a carbamoyl group (for example, N-ethylcarbamoyl or N,N-dibutylcarbamoyl), a sulfamoyl group (for example, N-ethylsulfamoyl, N,N-dipropylsulfamoyl or N-phenylsulfamoyl), a sulfonyl group (for example, methanesulfonyl, octanesulfonyl, benzenesulfonyl or toluenesulfonyl), an alkyloxycarbonyl group (for example, methoxycarbonyl or butyloxycarbonyl), a heterocyclic oxy group (for example, 1-phenyltetrazole-5-oxy or 2-tetrahydropyranyloxy), an azo group (for example, phenylazo, 4-methoxyphenylazo, 4-pivaloylaminophenylazo or 2-hydroxy-4-propanoylphenylazo), an acyloxy group (for example, acetoxy), a carbamoyloxy group (for example, N-methylcarbamoyloxy, N-phenylcarbamoyloxy), a silyloxy group (for example, trimethylsilyloxy or dibutylmethylsilyloxy), an aryloxycarbonylamino group (for example, phenoxycarbonylamino), an imide group (for example, N-succinimide or N-phthalimide), a heterocyclic thio group (for example, 2-benzothiazolylthio, 2,4-diphenoxy-1,3,5-triazole-6-thio or 2-pyridylthio), a sulfinyl group (for example, 3-phenoxypropylsulfinyl), a phosphonyl group (for example, phenoxyphosphonyl, octyloxyphosphonyl or phenylphosphonyl), an aryloxycarbonyl group (for example, phenoxycarbonyl), an acyl group (for example, acetyl, 3-phenylpropanoyl or benzoyl) and an ionic hydrophilic group (for example, a carboxyl group, a sulfo group, a phosphono group or a quaternary ammonium group). Of these, a hydroxyl group, a group having an ether bond or an ester bond, a cyano group, a sulfoneamide group are particularly preferable because the association properties of the dye are enhanced to improve toughness. In addition to the above, the substituent of the substituted alkyl groups $R_a$, $R_b$ and $R_c$ may have a halogen atom or an ionic hydrophilic group.

Specific examples of the substituted or unsubstituted alkyl groups $R_a$, $R_b$ and $R_c$ include, but not limited to, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, 4-sulfobutyl group and the like.

One embodiment of the dye (1) is a dye represented by the general formula (1), wherein $R_1$, $R_2$, $R_3$ and $R_4$ are substituents represented by —$SO_2$—$R_a$, wherein $R_a$ is a substituted or unsubstituted alkyl group, provided that not all the four substituted or unsubstituted alkyl groups $R_a$ in $R_1$, $R_2$, $R_3$ and $R_4$ are completely identical. Here, "not all the four groups $R_a$ being completely identical" means that, provided that at least one of the four groups $R_a$ is a substituted alkyl group having an ionic hydrophilic group, at least two types of $R_a$ are present.

A further embodiment of the dye (1) is a dye represented by the general formula (1), wherein k is a number satisfying $0<k<4$; l is a number satisfying $0<l<4$; m is a number satisfying $0\leq m<4$; n is a number satisfying $0\leq n<4$; and the sum of k, l, m and n is 4.

Specific examples of the dye (1) include, but not limited to, compounds represented by the chemical formulas (1-A) to (1-E) below.

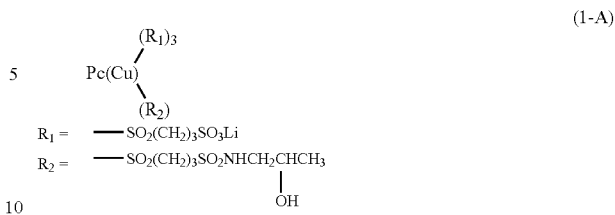

The compound represented by the chemical formula (1-A) is an embodiment of the dye (1), wherein, in the general formula (1), $R_1$ is a lithium sulfonato propylsulfonyl group; $R_2$ is an N-(2-hydroxypropyl) sulfamoylpropylsulfonyl group; k is 3; l is 1; and both m and n are 0.

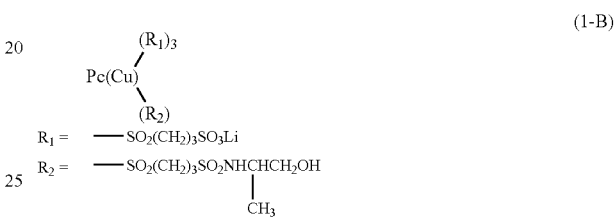

The compound represented by the chemical formula (1-B) is another embodiment of the dye (1), wherein, in the general formula (1), $R_1$ is a lithium sulfonato propylsulfonyl group; $R_2$ is an N-(2-hydroxyisopropyl) sulfamoylpropylsulfonyl group; k is 3; l is 1; and both m and n are 0.

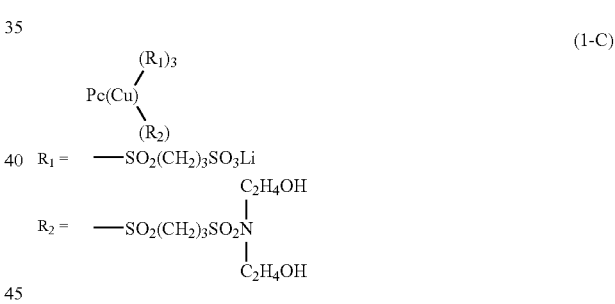

The compound represented by the chemical formula (1-C) is yet another embodiment of the dye (1), wherein, in the general formula (1), $R_1$ is a lithium sulfonato propylsulfonyl group; $R_2$ is an N,N-(di(2-hydroxyethyl)) sulfamoylpropylsulfonyl group; k is 3; l is 1; and both m and n are 0.

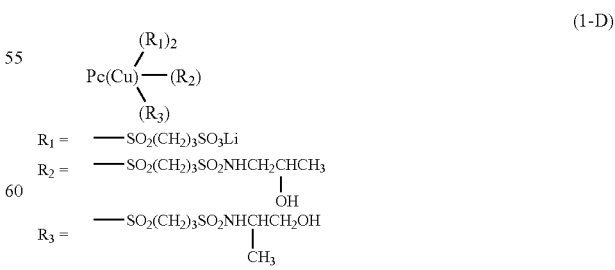

The compound represented by the chemical formula (1-D) is another embodiment of the dye (1), wherein, in the general formula (1), $R_1$ is a lithium sulfonato propylsulfonyl group;

$R_2$ is an N-(2-hydroxypropyl) sulfamoylpropylsulfonyl group; $R_3$ is an N-(2-hydroxyisopropyl) sulfamoylpropylsulfonyl group; k is 2; l is 1; m is 1; and n is 0.

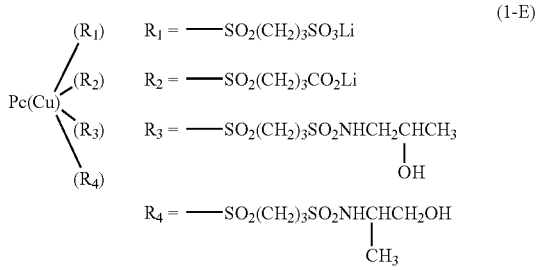

(1-E)

The compound represented by the chemical formula (1-E) is yet another embodiment of the dye (1), wherein, in the general formula (1), $R_1$ is a lithium sulfonato propylsulfonyl group; $R_2$ is a lithium carboxylate propylsulfonyl group; $R_3$ is an N-(2-hydroxypropyl) sulfamoylpropylsulfonyl group; $R_4$ is an N-(2-hydroxyisopropyl) sulfamoylpropylsulfonyl group; and k, l, m and n are 1.

A production method of the dye (1) represented by the general formula (1) will now be described below. Generally, when an unsubstituted phthalocyanine compound is sulfonated according to a method described in Published Japanese Translation of PCT International Application No. 2002-526589 (WO00/17275), a sulfo group can be relatively easily introduced into the phthalocyanine nucleus. When a sulfonated phthalocyanine compound is employed as a water soluble dye, a salt of the sulfo group is formed using an alkali metal hydroxide such as sodium hydroxide, and the obtained sulfonate can be used as a dye without further treatment. In this case, the sulfonation can occur at any position in the phthalocyanine nucleus, and it is difficult to control the number of introduced sulfo groups. Therefore, when sulfonation is carried out under reaction conditions in which the position and number of introduced sulfo groups are not taken into account and in which only the ease of sulfonation is taken into account, the position and number of the sulfo groups introduced into the product are difficult to identify. Thus, a mixture is obtained in which the number of substituents and the substitution positions are not uniform. Hence, in order to improve the ozone resistance of the dye (1), any product having poor ozone resistance must be prevented from being mixed. Therefore, it is essential that a specific substituent be introduced into a phthalic acid derivative in advance to synthesize both the copper phthalocyanine from this substituted phthalic acid derivative and a copper derivative such as $CuCl_2$. A method for synthesizing copper phthalocyanine from a phthalic acid derivative and a copper derivative is described in Japanese Patent Application Laid-Open No. 2000-303009 and the like.

An example of the production method of the dye (1) is described below. In this case, a substituted phthalic acid derivative can be produced by the following scheme detailed below.

As a phthalic acid derivative serving as a raw material, substituted phthalonitrile, substituted diiminoisoindoline, substituted phthalic acid diamide, substituted phtalimide, substituted phthalic acid and a salt thereof, substituted phthalic anhydride and the like may be employed.

The substituent of the substituted phthalic acid derivatives is a soluble group or a precursor thereof. The soluble group is a substituent which imparts solubility to a copper phthalocyanine dye. When a soluble group imparts water solubility to a copper phthalocyanine dye, the soluble group is a hydrophilic group. Examples of the hydrophilic group include, but not limited to, an ionic hydrophilic group and a substituent substituted by an ionic hydrophilic group. The precursor of a soluble group is a substituent which can be converted to a soluble group through a reaction after a phthalocyanine ring is formed. Preferably, the substituent of the substituted phthalic acid derivatives is a substituent selected from $—SO_2—R_a$, $—SO_2NR_bR_c$ and $—CO_2—R_a$. In this instance, $R_a$ represents a substituted or unsubstituted alkyl group, and $R_b$ represents a hydrogen atom or a substituted or unsubstituted alkyl group. Furthermore, $R_c$ represents a substituted or unsubstituted alkyl group.

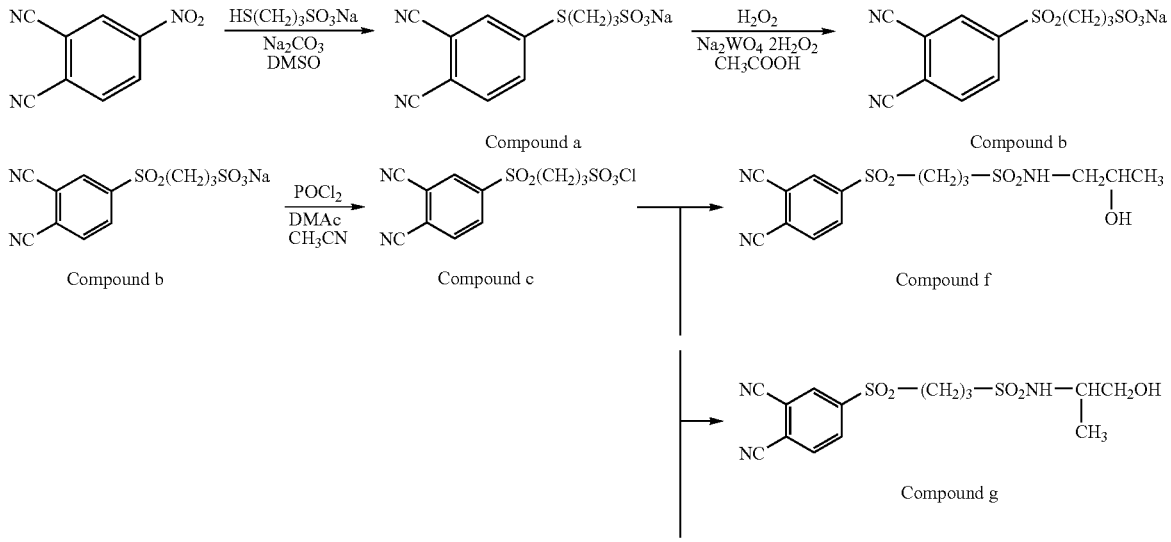

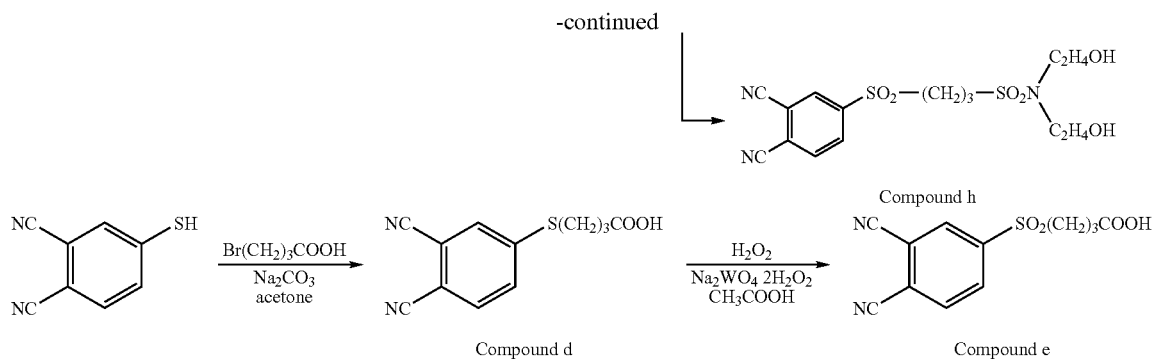

Compound h

The phthalic acid derivatives are typified by compounds a to h. A phthalic acid derivative is mixed with a metal derivative such as $CuCl_2$ in a molar ratio (metal derivative:phthalic acid derivative) of 3:1 to 6:1. Then, the mixture is reacted at a temperature ranging from 80° C. to 300° C. in the presence of an organic solvent having a boiling point of 80° C. or higher and preferably 130° C. or higher. When the reaction temperature is lower than 80° C., the reaction rate may be significantly decreased. Conversely, when the reaction temperature exceeds 300° C., the phthalocyanine dye obtained may be decomposed. In this case, the reaction time is preferably 2 hours to 20 hours. When the reaction time is less than 2 hours, a large amount of the raw materials may remain unreacted. Conversely, when the reaction time exceeds 20 hours, the phthalocyanine dye obtained may be decomposed. This reaction may be carried out in the presence of a catalyst such as 1,8-diazabicyclo [5. 4. 0]-7-undecene (DBU) or ammonium molybdate and the like. Replacement can be carried out, for example, according to the following method: the original cation is removed through dialysis; and then a monovalent metal cation is added (for example, an alkali metal hydroxide is added). After completion of the reaction, the reaction product is treated according to an ordinary post-treatment method for organic synthesis reaction, whereby the phthalocyanine-based dye (1), which has desired ozone resistance, represented by the general formula (1) can be obtained.

Next, a description is given of the substituent M, Pc(Cu), x and y in the general formula (2) of the dye (2).

As described above, in the general formula (2), Pc(Cu) represents the copper phthalocyanine nucleus represented by the general formula (4). Each of an $SO_3M$ group and an $SO_2NH_2$ group is present on any of the four benzene rings A, B, C and D of the copper phthalocyanine nucleus represented by the general formula (4). In this instance, M represents a monovalent metal cation selected from a lithium ion, a sodium ion and a potassium ion. x is a number satisfying $0<x<4$, and y is a number satisfying $0<y<4$. Furthermore, x and y satisfy $2 \leqq x+y \leqq 5$, and preferably the sum of x and y is 4.

Specific examples of the dye (2) include, but not limited to, compounds represented by chemical formulas (2-A) to (2-C) below.

(2-A)

The compound represented by the chemical formula (2-A) is an embodiment of the dye (2), wherein, in the general formula (2), M is sodium ion; x is 1; y is 3; and one substituent is present on each of the four benzene rings A, B, C and D of the copper phthalocyanine nucleus represented by the general formula (4).

(2-B)

The compound represented by the chemical formula (2-B) is another embodiment of the dye (2), wherein, in the general formula (2), M is sodium ion; both x and y are 2; and one substituent is present on each of the four benzene rings A, B, C and D of the copper phthalocyanine nucleus represented by the general formula (4).

(2-C)

The compound represented by the chemical formula (2-C) is yet another embodiment of the dye (2), wherein, in the general formula (2), M is sodium ion; x is 3; y is 1; and one substituent is present on each of the four benzene rings A, B, C and D of the copper phthalocyanine nucleus represented by the general formula (4).

The dye (2) represented by the general formula (2) can be produced by a known copper phthalocyanine substitution method having, for example, the following steps (i), (ii) and (iii) or by other method.

Step (i)

First, copper phthalocyanine is chlorosulfonated with a chlorosulfonating agent. For example, an agent containing a mixture of chlorosulfonic acid and a chlorinating agent (phosphorus oxychloride or phosphorus trichloride) is employed as the chlorosulfonating agent. The molar ratio of the chlorosulfonic acid to the copper phthalocyanine compound (chlorosulfonic acid:copper phthalocyanine compound) is preferably within the range of from 5:1 to 200:1. The molar ratio of the chlorinating agent to copper phthalocyanine (chlorinating agent:copper phthalocyanine) is preferably within the range of from 0.5:1 to 10:1.

This chlorosulfonation reaction is carried out at a temperature ranging from 90° C. to 180° C. for 0.5 hours to 16 hours. Generally, the reaction time of the chlorosulfonation depends on the reaction temperature. The reaction time tends to be short as the reaction temperature is increased, and the reaction time tends to be long as the reaction temperature is decreased. Preferred temperature and time conditions for chlorosulfonation are in the range of 135° C. to 145° C. for 1.5 hours to 5.0 hours.

Furthermore, the chlorosulfonating agent may contain sulfuric acid. When the chlorosulfonating agent contains sulfuric acid, the molar ratio of sulfuric acid to the copper phthalocyanine compound (sulfuric acid:copper phthalocyanine compound) is preferably within the range of from 0.3:1 to 2:1.

Step (ii)

Next, the product obtained in step (i) is condensed with ammonia to obtain a compound represented by the chemical formula (2') below.

This step is carried out using ammonium hydroxide in an amount of 3 wt % to 35 wt % at a reaction temperature ranging of from 0° C. to 50° C. Generally, the reaction time depends on the reaction temperature. The reaction time tends to be short as the reaction temperature is increased, and the reaction time tends to be long as the reaction temperature is decreased. Preferred temperature and time conditions for the condensation reaction are a temperature of 0° C. to 45° C. for 0.5 hours to 24 hours.

Step (iii)

Next, $NH_4^+$ in the compound represented by the chemical formula (2') and obtained in step (ii) is replaced with a monovalent metal cation. In this metal cation replacement reaction, replacement can be carried out, for example, according to the following method. First, the product obtained in step (ii) is made acidic (for example, $NH_4^+$ is replaced with $H^+$ using hydrochloric acid). Then, the original cation is removed through dialysis, and a monovalent metal cation is added (for example, an alkali metal hydroxide is added). The copper phthalocyanine-based dye (2) represented by the general formula (2) can be produced through the above steps.

Next, a description will be given of the substituents and Pc(Cu) in the general formula (3) of the dye (3).

As described above, in the general formula (3), Pc(Cu) represents the copper phthalocyanine nucleus represented by the general formula (4). Each of an $SO_3NH_4$ group and an $SO_xNH_2$ group is present on any of the four benzene rings A, B, C and D of the copper phthalocyanine nucleus represented by the general formula (4).

The dye (3) represented by the general formula (3) can be produced by a known copper phthalocyanine substitution method having, for example, the following steps (a) and (b), or by other methods.

Step (a)

First, copper phthalocyanine is chlorosulfonated with a chlorosulfonating agent. For example, an agent containing a mixture of chlorosulfonic acid and a chlorinating agent (phosphorus oxychloride or phosphorus trichloride) is employed as the chlorosulfonating agent. The molar ratio of the chlorosulfonic acid to the copper phthalocyanine compound (chlorosulfonic acid:copper phthalocyanine compound) is preferably within the range of from 5:1 to 200:1. The molar ratio of the chlorinating agent to copper phthalocyanine (chlorinating agent:copper phthalocyanine) is preferably within the range of from 0.5:1 to 10:1.

This chlorosulfonation reaction is carried out at a temperature ranging from 90° C. to 180° C. for 0.5 hours to 16 hours. Generally, the reaction time of the chlorosulfonation depends on the reaction temperature. The reaction time tends to be short as the reaction temperature is increased, and the reaction time tends to be long as the reaction temperature is decreased. Preferred temperature and time conditions for chlorosulfonation are a temperature of 135° C. to 145° C. for 1.5 hours to 5.0 hours.

Furthermore, the chlorosulfonating agent may contain sulfuric acid. When the chlorosulfonating agent contains sulfuric acid, the molar ratio of sulfuric acid to the copper phthalocyanine compound (sulfuric acid:copper phthalocyanine compound) is preferably within the range of from 0.3:1 to 2:1.

Step (b)

Next, the product obtained in step (a) is condensed with ammonia to obtain a compound represented the by the general formula (3) below.

This step is carried out using ammonium hydroxide in an amount of 3 wt % to 35 wt % at a reaction temperature ranging of 0° C. to 50° C. Generally, the reaction time depends on the reaction temperature. The reaction time tends to be short as the reaction temperature is increased, and the reaction time tends to be long as the reaction temperature is decreased. Preferred temperature and time conditions for the condensation reaction are a temperature of 0° C. to 45° C. for 0.5 hours to 24 hours.

C. I. Direct Blue 86 can be available as a commercial dye product. In this instance, C. I. Direct Blue 86 is a dye represented by, for example, the following general formula (5).

In the general formula (5), Pc(Cu) represents the copper phthalocyanine nucleus represented by the general formula (4), and an $SO_3Na$ group is present on any of the four benzene rings A, B, C and D of the phthalocyanine nucleus represented by the general formula (4).

A description will now be given of water and a water soluble organic solvent contained in the cyan ink for ink-jet recording of the present invention.

The water employed in the present invention is preferably ion exchanged water containing a small amount of salts. The cyan ink for ink-jet recording contains various components in predetermined amounts, and the balance is made up with water. Therefore, the amount of water used depends on the amounts of the other components. The amount of water is normally in the range of about 10 wt % to about 90 wt % and is often in the range of about 40 wt % to about 80 wt %.

Examples of the water soluble organic solvent employed in the present invention include, but not limited to, a humectant for mainly preventing drying of ink at the end portion of the nozzles of an ink-jet head and a penetrant for mainly increasing drying speed on paper.

Examples of the humectant include, but not limited to, lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; polyalkylene glycols such as polyethylene glycol, polypropylene glycol and the like; alkylene glycols such as ethylene glycol, propylene glycol, butylene glycol, diethylene glycol, triethylene glycol, dipropylene glycol, tripropylene glycol, thiodiglycol, hexylene glycol and the like; glycerin; 2-pyrrolidone; N-methyl-2-pyrrolidone; 1,3-dimethyl-2-imidazolidinone; and the like. Of these, polyalcohols such as alkylene glycols, glycols and the like are suitable.

The amount of the humectant in the cyan ink for ink-jet recording is generally in the range of 0 wt % to about 95 wt %, often in the range of about 10 wt % to about 80 wt %, and more often in the range of about 10 wt % to about 50 wt %.

Furthermore, examples of the penetrant include, but not limited to, glycol-based ethers such as ethylene glycol methyl ether, ethylene glycol ethyl ether, ethylene glycol propyl ether, diethylene glycol methyl ether, diethylene glycol ethyl ether, diethylene glycol propyl ether, triethylene glycol methyl ether, triethylene glycol ethyl ether, triethylene glycol propyl ether, propylene glycol methyl ether, propylene glycol ethyl ether, propylene glycol propyl ether, dipropylene glycol methyl ether, dipropylene glycol ethyl ether, dipropylene glycol propyl ether, tripropylene glycol methyl ether, tripropylene glycol ethyl ether, tripropylene glycol propyl ether and the like.

The amount of the penetrant in the cyan ink for ink-jet recording is generally in the range of 0 wt % to about 20 wt %, often in the range of about 0.1 wt % to about 15 wt % and more often in the range of about 1 wt % to about 10 wt %. It should be noted that, when the amount of the penetrant is too large, the penetrability of ink to paper becomes excessively high to cause blurring.

The cyan ink for ink-jet recording of the present invention may contain other conventionally known additives including: viscosity modifiers such as polyvinyl alcohol, cellulose, water soluble resin and the like; surface tension modifiers; mildewproofing agents; and the like in accordance with need.

The cyan ink for ink-jet recording of the present invention can be prepared by uniformly mixing the coloring agent which contains the dye (1) and at least one dye selected from the group consisting of the dye (2), the dye (3) and C. I. Direct Blue 86, water, the water soluble organic solvents and, if necessary, other various additives by means of routine methods.

EXAMPLES

Examples A1 to A7, Examples B1 to B7, Examples C1 to C7, Comparative Examples A1 to A6, Comparative Examples B1 to B6 and Comparative Examples C1 to C6

The components of each of the ink compositions shown in Tables 1 to 3 were mixed uniformly, thereby preparing each cyan ink for ink-jet recording. In this instance, dyes (1-A) to (1-E) correspond to the compounds represented by the chemical formulas (1-A) to (1-E), respectively. Dyes (2-A) to (2-C) correspond to the compounds represented by the chemical formulas (2-A) to (2-C), respectively.

In addition to this, C. I. Acid Blues 9 and 74 employed in the Comparative Examples are not phthalocyanine-based dyes, but are cyan dyes having the respective structures shown below.

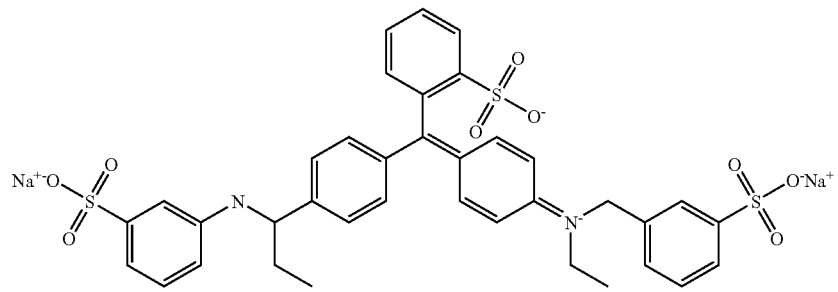

C.I. Acid Blue 9

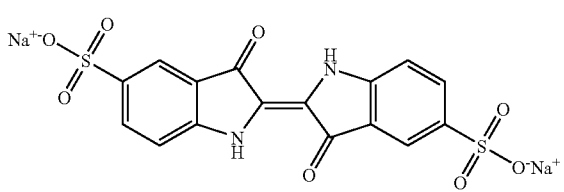

C.I. Acid Blue 74

For each of the obtained cyan inks for ink-jet recording, the following evaluations were performed: (a) evaluation of ejection stability, (b) evaluation of color developing properties, (c) evaluation of ozone resistance, (d) evaluation of light fastness and (e) overall evaluation.

First, each of the cyan inks for ink-jet recording was filled into a desired ink cartridge, and each ink cartridge was attached to a digital multifunction device equipped with an ink-jet printer (DCP-110C, product of Brother Industries, Ltd.) to perform the printing evaluation. As the samples for (b) evaluation of color developing properties, (c) evaluation of ozone resistance, and (d) evaluation of light fastness, gradation samples for each of the cyan inks were printed on glossy paper (photo glossy paper (Model No. BP60GLA), product of Brother Industries, Ltd.). In this instance, a patch having an initial OD (Optical Density) value of 1.0 was employed.

(a) Evaluation of Ejection Stability 100 million dots (about 30 thousands sheets) were continuously printed, and evaluation was made according to the following criteria. The results obtained are shown in Tables 1 to 3.

Criteria for Ejection Stability Evaluation

AA: No non-ejection and ejection bending occur during continuous printing.

A: Non-ejection or ejection bending occurs to a small extent during continuous printing. The non-ejection or ejection bending is rectified by repeating purging at most five times.

C: Non-ejection and ejection bending occur to a large extent during continuous printing. Neither the non-ejection nor ejection bending is rectified in a short time.

(b) Evaluation of Color Developing Properties

Each of the above-listed gradation samples was visually observed to evaluate whether or not the color of the cyan ink was satisfactorily developed according to the following criteria. The results obtained are shown in Tables 1 to 3.

Criteria for Evaluating Color Developing Properties

A: Cyan color is satisfactorily developed.

C: Cyan color is not satisfactorily developed.

(c) Evaluation of Ozone Resistance

An ozone resistance test was performed using the above gradation samples. The ozone resistance test was performed by allowing the samples to stand in an atmosphere with an ozone concentration of 1 ppm, a chamber temperature of 24° C., and a humidity of 60% RH for 40 hours using an Ozone Weather Meter OMS-H (product of Suga Test Instruments Co., Ltd.). Cyan-color patches having an OD value of 1.0 before the test was measured for an OD value after the ozone resistance test. The OD values were measured by means of a Spectrolino (product of Gretag Macbeth) (light source: $D_{65}$; viewing angle: 2°; Status A). An OD value reduction ratio for ozone resistance with respect to the OD value (1.0) of the patch before the test was determined from equation (I) below. The obtained OD value reduction ratio for ozone resistance was evaluated according to the following criteria. The results obtained are shown in Tables 1 to 3.

$$(OD \text{ value reduction ratio for ozone resistance}) = \{1.0(OD \text{ value before test}) - (OD \text{ value after test})\} / \{1.0(OD \text{ value before test})\} * 100 \quad \text{(Equation I)}$$

Criteria for Evaluating Ozone Resistance

AA: The OD value reduction ratio for ozone resistance is less than 20%.

A: The OD value reduction ratio for ozone resistance is 20% or more and less than 30%.

B: The OD value reduction ratio for ozone resistance is 30% or more and less than 40%.

C: The OD value reduction ratio for ozone resistance is 40% or more.

(d) Evaluation of Light Fastness

A light fastness test was performed using the above gradation samples. The light fastness test was conducted using a high energy xenon weather meter SC750-WN (product of Suga Test Instruments Co., Ltd.). The gradation samples were irradiated with light radiated from a xenon light source for 100 hours at a room temperature of 25° C., a humidity of 50% RH, and an illuminance of 93,000 Lux. Cyan-color patches having an OD value of 1.0 before the test was measured for an OD value after the light fastness test. The OD values were measured by means of a Spectrolino (product of Gretag Macbeth) (light source: $D_{65}$; viewing angle: 2°; Status A). An OD value reduction ratio for light fastness with respect to the OD value (1.0) of the patch before the test was determined from equation (II) below. The obtained OD value reduction ratio for light fastness was evaluated according to the following criteria. The results obtained are shown in Tables 1 to 3.

$$(OD \text{ value reduction ratio for light fastness}) = \{1.0(OD \text{ value before test}) - (OD \text{ value after test})\} / \{1.0(OD \text{ value before test})\} * 100 \quad \text{(Equation II)}$$

Criteria for Evaluating Light Fastness

AA: The OD value reduction ratio for light fastness is less than 20%.

A: The OD value reduction ratio for light fastness is 20% or more and less than 30%.

B: The OD value reduction ratio for light fastness is 30% or more and less than 40%.

C: The OD value reduction ratio for light fastness is 40% or more.

(e) Overall Evaluation

An overall evaluation was conducted based on the above evaluation results for each of the inks according to the following criteria. The results obtained are shown in Tables 1 to 3.

Criteria for Overall Evaluation

G: All of the evaluation results are AA or A.

NG: The evaluation results contain B or C.

TABLE 1

|  |  |  | Ex A1 | Ex A2 | Ex A3 | Ex A4 | Ex A5 | Ex A6 | Ex A7 | Comp Ex A1 | Comp Ex A2 | Comp Ex A3 | Comp Ex A4 | Comp Ex A5 | Comp Ex A6 |
|---|---|---|---|---|---|---|---|---|---|---|---|---|---|---|---|
| Ink composition (wt %) | Dye (1) | Dye (1-A) | 3.88 | 3.72 | — | — | — | — | — | 4.0 | — | — | — | — | — |
|  |  | Dye (1-B) | — | — | 3.2 | — | 2.4 | — | — | — | — | — | — | — | — |
|  |  | Dye (1-C) | — | — | — | 2.8 | — | — | — | — | 3.2 | — | — | — | — |
|  |  | Dye (1-D) | — | — | — | — | — | 2.4 | — | — | — | 3.2 | — | — | — |
|  |  | Dye (1-E) | — | — | — | — | — | — | 4.0 | — | — | — | — | — | — |

TABLE 1-continued

|  |  |  | Ex A1 | Ex A2 | Ex A3 | Ex A4 | Ex A5 | Ex A6 | Ex A7 | Comp Ex A1 | Comp Ex A2 | Comp Ex A3 | Comp Ex A4 | Comp Ex A5 | Comp Ex A6 |
|---|---|---|---|---|---|---|---|---|---|---|---|---|---|---|---|
|  | Dye (2) | Dye (2-A) | 0.12 | 0.28 | — | — | — | 0.6 | — | — | — | — | 3.0 | — | — |
|  |  | Dye (2-B) | — | — | 0.8 | — | — | — | 1.0 | — | — | — | — | — | — |
|  |  | Dye (2-C) | — | — | — | 1.2 | 1.6 | — | — | — | — | — | — | — | — |
|  | Comparison Dye | C.I. Acid Blue 9 | — | — | — | — | — | — | — | — | 0.8 | — | — | 3.0 | — |
|  |  | C.I. Acid Blue 74 | — | — | — | — | — | — | — | — | — | 0.8 | — | — | 3.0 |
|  | Glycerin |  | 27.0 | 27.0 | 27.0 | 27.0 | 27.0 | 27.0 | 27.0 | 27.0 | 27.0 | 27.0 | 27.0 | 27.0 | 27.0 |
|  | Dipropylene glycol-n-propyl ether |  | 2.0 | 2.0 | 2.0 | 2.0 | 2.0 | 2.0 | 2.0 | 2.0 | 2.0 | 2.0 | 2.0 | 2.0 | 2.0 |
|  | OLFINE® E1010 *1 |  | 0.2 | 0.2 | 0.2 | 0.2 | 0.2 | 0.2 | 0.2 | 0.2 | 0.2 | 0.2 | 0.2 | 0.2 | 0.2 |
|  | Proxel XL-2(S) *2 |  | 0.2 | 0.2 | 0.2 | 0.2 | 0.2 | 0.2 | 0.2 | 0.2 | 0.2 | 0.2 | 0.2 | 0.2 | 0.2 |
|  | Water |  |  |  |  |  |  |  |  | Balance |  |  |  |  |  |
| Ink | Weight ratio of dyes (Dye (1):Dye (2)) |  | 97:3 | 93:7 | 80:20 | 70:30 | 60:40 | 80:20 | 80:20 | — | (80:20) *3 | (80:20) *3 | — | — | — |
|  | Total amount of dyes in ink (wt %) |  | 4.0 | 4.0 | 4.0 | 4.0 | 4.0 | 3.0 | 5.0 | 4.0 | 4.0 | 4.0 | 3.0 | 3.0 | 3.0 |
| Evaluation | Ejection stability |  | A | AA | AA | AA | AA | AA | AA | C | AA | AA | AA | AA | AA |
|  | Color developing properties |  | A | A | A | A | A | A | A | C | A | C | A | A | C |
|  | Ozone resistance |  | AA | AA | AA | AA | A | AA | AA | AA | B | B | B | C | C |
|  | OD value reduction ratio of patch (initial OD = 1.0) (%) |  | 8 | 10 | 12 | 15 | 26 | 12 | 12 | 7 | 34 | 32 | 38 | 63 | 68 |
|  | Light fastness |  | AA | AA | AA | AA | AA | AA | AA | AA | B | B | AA | C | C |
|  | OD value reduction ratio of patch (initial OD = 1.0) (%) |  | 4 | 4 | 3 | 4 | 3 | 4 | 4 | 3 | 32 | 35 | 3 | 52 | 55 |
|  | Overall evaluation |  | G | G | G | G | G | G | G | NG | NG | NG | NG | NG | NG |

*1: Acetylene glycol-based surfactant (product of Nissin Chemical Industry Co., Ltd.)
*2: Mildewproofing agent (product of Arch Chemicals, Inc.)
*3: For Comparative Example A2 and A3, weight ratio of dye (1) and comparison dye (C.I. Acid Blue 9 or 74)

TABLE 2

|  |  |  | Ex B1 | Ex B2 | Ex B3 | Ex B4 | Ex B5 | Ex B6 | Ex B7 | Comp Ex B1 | Comp Ex B2 | Comp Ex B3 | Comp Ex B4 | Comp Ex B5 | Comp Ex B6 |
|---|---|---|---|---|---|---|---|---|---|---|---|---|---|---|---|
| Ink composition (wt %) | Dye (1) | Dye (1-A) | 3.88 | 3.72 | — | — | — | — | — | 4.0 | — | — | — | — | — |
|  |  | Dye (1-B) | — | — | 3.2 | — | 2.4 | — | — | — | — | — | — | — | — |
|  |  | Dye (1-C) | — | — | — | 2.8 | — | — | — | — | 3.2 | — | — | — | — |
|  |  | Dye (1-D) | — | — | — | — | — | 2.4 | — | — | — | 3.2 | — | — | — |
|  |  | Dye (1-E) | — | — | — | — | — | — | 4.0 | — | — | — | — | — | — |
|  | Dye (3) | Dye (3) | 0.12 | 0.28 | 0.8 | 1.2 | 1.6 | 0.6 | 1.0 | — | — | — | 3.0 | — | — |
|  | Comparison Dye | C.I. Acid Blue 9 | — | — | — | — | — | — | — | — | 0.8 | — | — | 3.0 | — |
|  |  | C.I. Acid Blue 74 | — | — | — | — | — | — | — | — | — | 0.8 | — | — | 3.0 |
|  | Glycerin |  | 27.0 | 27.0 | 27.0 | 27.0 | 27.0 | 27.0 | 27.0 | 27.0 | 27.0 | 27.0 | 27.0 | 27.0 | 27.0 |
|  | Dipropylene glycol-n-propyl ether |  | 2.0 | 2.0 | 2.0 | 2.0 | 2.0 | 2.0 | 2.0 | 2.0 | 2.0 | 2.0 | 2.0 | 2.0 | 2.0 |
|  | OLFINE® E1010 *1 |  | 0.2 | 0.2 | 0.2 | 0.2 | 0.2 | 0.2 | 0.2 | 0.2 | 0.2 | 0.2 | 0.2 | 0.2 | 0.2 |
|  | Proxel XL-2(S) *2 |  | 0.2 | 0.2 | 0.2 | 0.2 | 0.2 | 0.2 | 0.2 | 0.2 | 0.2 | 0.2 | 0.2 | 0.2 | 0.2 |
|  | Water |  |  |  |  |  |  |  |  | Balance |  |  |  |  |  |
| Ink | Weight ratio of dyes (Dye (1):Dye (3)) |  | 97:3 | 93:7 | 80:20 | 70:30 | 60:40 | 80:20 | 80:20 | — | (80:20) *3 | (80:20) *3 | — | — | — |
|  | Total amount of dyes in ink (wt %) |  | 4.0 | 4.0 | 4.0 | 4.0 | 4.0 | 3.0 | 5.0 | 4.0 | 4.0 | 4.0 | 3.0 | 3.0 | 3.0 |
| Evaluation | Ejection stability |  | A | AA | AA | AA | AA | AA | AA | C | AA | AA | AA | AA | AA |
|  | Color developing properties |  | A | A | A | A | A | A | A | C | A | C | A | A | C |
|  | Ozone resistance |  | AA | AA | AA | AA | A | AA | AA | AA | B | B | C | C | C |
|  | OD value reduction ratio of patch (initial OD = 1.0) (%) |  | 9 | 11 | 13 | 17 | 28 | 13 | 14 | 7 | 34 | 32 | 40 | 63 | 68 |
|  | Light fastness |  | AA | AA | AA | AA | AA | AA | AA | AA | B | B | AA | C | C |
|  | OD value reduction ratio of patch (initial OD = 1.0) (%) |  | 5 | 4 | 4 | 5 | 6 | 6 | 5 | 3 | 32 | 35 | 4 | 52 | 55 |
|  | Overall evaluation |  | G | G | G | G | G | G | G | NG | NG | NG | NG | NG | NG |

*1: Acetylene glycol-based surfactant (product of Nissin Chemical Industry Co., Ltd.)
*2: Mildewproofing agent (product of Arch Chemicals, Inc.)
*3: For Comparative Example B2 and B3, weight ratio of dye (1) and comparison dye (C.I. Acid Blue 9 or 74)

TABLE 3

| | | | Ex C1 | Ex C2 | Ex C3 | Ex C4 | Ex C5 | Ex C6 | Ex C7 | Comp Ex C1 | Comp Ex C2 | Comp Ex C3 | Comp Ex C4 | Comp Ex C5 | Comp Ex C6 |
|---|---|---|---|---|---|---|---|---|---|---|---|---|---|---|---|
| Ink composition (wt %) | Dye (1) | Dye(1-A) | 3.88 | 3.72 | — | — | — | — | — | 4.0 | — | — | — | — | — |
| | | Dye (1-B) | — | — | 3.2 | — | 2.4 | — | — | — | — | — | — | — | — |
| | | Dye (1-C) | — | — | — | 2.8 | — | — | — | — | 3.2 | — | — | — | — |
| | | Dye (1-D) | — | — | — | — | — | 2.4 | — | — | — | 3.2 | — | — | — |
| | | Dye (1-E) | — | — | — | — | — | — | 4.0 | — | — | — | — | — | — |
| | | C.I. Direct Blue 86 | 0.12 | 0.28 | 0.8 | 1.2 | 1.6 | 0.6 | 1.0 | — | — | — | 3.0 | — | — |
| | Comparison Dye | C.I. Acid Blue 9 | — | — | — | — | — | — | — | — | 0.8 | — | — | 3.0 | — |
| | | C.I. Acid Blue 74 | — | — | — | — | — | — | — | — | — | 0.8 | — | — | 3.0 |
| | | Glycerin | 27.0 | 27.0 | 27.0 | 27.0 | 27.0 | 27.0 | 27.0 | 27.0 | 27.0 | 27.0 | 27.0 | 27.0 | 27.0 |
| | | Dipropylene glycol-n-propyl ether | 2.0 | 2.0 | 2.0 | 2.0 | 2.0 | 2.0 | 2.0 | 2.0 | 2.0 | 2.0 | 2.0 | 2.0 | 2.0 |
| | | OLFINE ® E1010 *1 | 0.2 | 0.2 | 0.2 | 0.2 | 0.2 | 0.2 | 0.2 | 0.2 | 0.2 | 0.2 | 0.2 | 0.2 | 0.2 |
| | | Proxel XL-2(S) *2 | 0.2 | 0.2 | 0.2 | 0.2 | 0.2 | 0.2 | 0.2 | 0.2 | 0.2 | 0.2 | 0.2 | 0.2 | 0.2 |
| | | Water | | | | | | | | Balance | | | | | |
| Ink | | Weight ratio of dyes (Dye (1):C.I. Direct Blue 86) | 97:3 | 93:7 | 80:20 | 70:30 | 60:40 | 80:20 | 80:20 | — | (80:20) *3 | (80:20) *3 | — | — | — |
| | | Total amount of dyes in ink (wt %) | 4.0 | 4.0 | 4.0 | 4.0 | 4.0 | 3.0 | 5.0 | 4.0 | 4.0 | 4.0 | 3.0 | 3.0 | 3.0 |
| Evaluation | | Ejection stability | A | AA | AA | AA | AA | AA | AA | C | AA | AA | AA | AA | AA |
| | | Color developing properties | A | A | A | A | A | A | A | C | A | C | A | A | C |
| | | Ozone resistance | AA | AA | AA | AA | A | AA | AA | AA | B | B | C | C | C |
| | | OD value reduction ratio of patch (initial OD = 1.0) (%) | 10 | 12 | 13 | 18 | 27 | 11 | 15 | 7 | 34 | 32 | 42 | 63 | 68 |
| | | Light fastness | AA | AA | AA | AA | AA | AA | AA | AA | B | B | AA | C | C |
| | | OD value reduction ratio of patch (initial OD = 1.0) (%) | 6 | 4 | 5 | 6 | 7 | 5 | 4 | 3 | 32 | 35 | 6 | 52 | 55 |
| | | Overall evaluation | G | G | G | G | G | G | G | NG | NG | NG | NG | NG | NG |

*1: Acetylene glycol-based surfactant (product of Nissin Chemical Industry Co., Ltd.)
*2: Mildewproofing agent (product of Arch Chemicals, Inc.)
*3: For Comparative Example C2 and C3, weight ratio of dye (1) and comparison dye (C.I. Acid Blue 9 or 74)

From the results shown in Tables 1 to 3, the following findings were obtained for Examples and Comparative Examples.

Example A1 (the total amount of dyes used in the coloring agent: 4%): This ink contains the dye (2-A) in an amount being 3% of the total amount of the dyes used in this example, the dye (2-A) having good solubility in water and good color developing properties. Thus, the ink could be stably ejected, and the developed color was excellent. Furthermore, the ink contains the dye (1-A), which has good ozone resistance and good light fastness, in an amount being 97% of the total amount of the dyes used in this example. Thus, the ozone resistance and the light fastness were excellent.

Example A2 (the total amount of dyes used in the coloring agent: 4%): This ink contains the dye (2-A) in an amount being 7% of the total amount of the dyes used in this example, the dye (2-A) having good solubility in water and good color developing properties. Thus, the ink could be stably ejected, and the developed color was excellent. Furthermore, the ink contains the dye (1-A), which has good ozone resistance and good light fastness, in an amount being 93% of the total amount of the dyes used in this example. Thus, the ozone resistance and the light fastness were excellent.

Example A3 (the total amount of dyes used in the coloring agent: 4%): This ink contains the dye (2-B) in an amount being 20% of the total amount of the dyes used in this example, the dye (2-B) having good solubility in water and good color developing properties. Thus, the ink could be stably ejected, and the developed color was excellent. Furthermore, the ink contains the dye (1-B), which has good ozone resistance and good light fastness, in an amount being 80% of the total amount of the dyes used in this example. Thus, the ozone resistance and the light fastness were excellent.

Example A4 (the total amount of dyes used in the coloring agent: 4%): This ink contains the dye (2-C) in an amount being 30% of the total amount of the dyes used in this example, the dye (2-C) having good solubility in water and good color developing properties. Thus, the ink could be stably ejected, and the developed color was excellent. Furthermore, the ink contains the dye (1-C), which has good ozone resistance and good light fastness, in an amount being 70% of the total amount of the dyes used in this example. Thus, the ozone resistance and the light fastness were excellent.

Example A5 (the total amount of dyes used in the coloring agent: 4%): This ink contains the dye (2-C) in an amount being 40% of the total amount of the dyes used in this example, the dye (2-C) having good solubility in water and good color developing properties. Thus, the ink could be stably ejected, and the developed color was excellent. Furthermore, the ink contains the dye (1-B), which has good ozone resistance and good light fastness, in an amount being 60% of the total amount of the dyes used in this example. Thus, the ozone resistance and the light fastness were excellent. However, because the ratio of the amount of the dye (1-B) is somewhat smaller, the ozone resistance was somewhat poorer than the other Examples.

Example A6 (the total amount of dyes used in the coloring agent: 3%): This ink contains the dye (2-A) in an amount being 20% of the total amount of the dyes used in this example, the dye (2-A) having good solubility in water and good color developing properties. Thus, the ink could be stably ejected, and the developed color was excellent. Furthermore, the ink contains the dye (1-D), which has good ozone resistance and good light fastness, in an amount being 80% of the total amount of the dyes used in this example. Thus, the ozone resistance and the light fastness were excellent.

Example A7 (the total amount of dyes used in the coloring agent: 5%): This ink contains the dye (2-B) in an amount being 20% of the total amount of the dyes used in this example, the dye (2-B) having good solubility in water and good color developing properties. Thus, the ink could be stably ejected, and the developed color was excellent. Furthermore, the ink contains the dye (1-E), which has good ozone resistance and good light fastness, in an amount being 80% of the total amount of the dyes used in this example. Thus, the ozone resistance and the light fastness were excellent.

Comparative Example A1 (the total amount of dyes in the coloring agent: 4%): In this ink, only the dye (1-A) is employed. Thus, although the ozone resistance and light fastness were excellent, a problem arose with ejection stability. Furthermore, the developed color was unsatisfactory.

Comparative Example A2 (the total amount of dyes used in the coloring agent: 4%): This ink contains C. I. Acid Blue 9 in an amount being 20% of the total amount of the dyes used in this example, C. I. Acid Blue 9 having good solubility in water and good color developing properties. Thus, the ink could be stably ejected. However, C. I. Acid Blue 9 has poor ozone resistance and poor light fastness. Therefore, even when C. I. Acid Blue 9 was mixed with the dye (1-C), the ozone resistance and the light fastness were unsatisfactory.

Comparative Example A3 (the total amount of dyes used in the coloring agent: 4%): This ink contains C. I. Acid Blue 74 in an amount being 20% of the total amount of the dyes used in this example, C. I. Acid Blue 74 having good solubility in water. Thus, the ink could be stably ejected. However, because C. I. Acid Blue 74 having poor color developing properties was used in an amount being 20% of the total amount of the dyes, the developed color was unsatisfactory. Furthermore, C. I. Acid Blue 74 has poor ozone resistance and poor light fastness. Therefore, even when C. I. Acid Blue 74 was mixed with the dye (1-D), the ozone resistance and the light fastness were unsatisfactory.

Comparative Example A4 (the total amount of dyes in the coloring agents: 3%): In this ink, only the dye (2-A) is employed. Thus, the ink could be stably ejected, and the developed color was excellent. However, because the dye (2-A) has poor ozone resistance, the ozone resistance was unsatisfactory.

Comparative Example A5 (the total amount of dyes in the coloring agent: 3%): In this ink, only C. I. Acid Blue 9 is employed. Thus, the ink could be stably ejected, and the developed color was excellent. However, because C. I. Acid Blue 9 has poor ozone resistance and poor light fastness, the ozone resistance and light fastness were unsatisfactory.

Comparative Example A6 (the total amount of dyes in the coloring agent: 3%): In this ink, only C. I. Acid Blue 74 is employed. Thus, the ink could be stably ejected. However, C. I. Acid Blue 74 has poor color developing properties, poor ozone resistance and poor light fastness. Therefore, the color developing properties, ozone resistance and light fastness were unsatisfactory.

Example B1 (the total amount of dyes used in the coloring agent: 4%): This ink contains the dye (3) in an amount being 3% of the total amount of the dyes used in this example, the dye (3) having good solubility in water and good color developing properties. Thus, the ink could be stably ejected, and the developed color was excellent. Furthermore, the ink contains the dye (1-A), which has good ozone resistance and good light fastness, in an amount being 97% of the total amount of the dyes used in this example. Thus, the ozone resistance and the light fastness were excellent.

Example B2 (the total amount of dyes used in the coloring agent: 4%): This ink contains the dye (3) in an amount being 7% of the total amount of the dyes used in this example, the dye (3) having good solubility in water and good color developing properties. Thus, the ink could be stably ejected, and the developed color was excellent. Furthermore, the ink contains the dye (1-A), which has good ozone resistance and good light fastness, in an amount being 93% of the total amount of the dyes used in this example. Thus, the ozone resistance and the light fastness were excellent.

Example B3 (the total amount of dyes used in the coloring agent: 4%): This ink contains the dye (3) in an amount being 20% of the total amount of the dyes used in this example, the dye (3) having good solubility in water and good color developing properties. Thus, the ink could be stably ejected, and the developed color was excellent. Furthermore, the ink contains the dye (1-B), which has good ozone resistance and good light fastness, in an amount being 80% of the total amount of the dyes used in this example. Thus, the ozone resistance and the light fastness were excellent.

Example B4 (the total amount of dyes used in the coloring agent: 4%): This ink contains the dye (3) in an amount being 30% of the total amount of the dyes used in this example, the dye (3) having good solubility in water and good color developing properties. Thus, the ink could be stably ejected, and the developed color was excellent. Furthermore, the ink contains the dye (1-C), which has good ozone resistance and good light fastness, in an amount being 70% of the total amount of the dyes used in this example. Thus, the ozone resistance and the light fastness were excellent.

Example B5 (the total amount of dyes used in the coloring agent: 4%): This ink contains the dye (3) in an amount being 40% of the total amount of the dyes used in this example, the dye (3) having good solubility in water and good color developing properties. Thus, the ink could be stably ejected, and the developed color was excellent. Furthermore, the ink contains the dye (1-B), which has good ozone resistance and good light fastness, in an amount being 60% of the total amount of the dyes used in this example. Thus, the ozone resistance and the light fastness were excellent. However, because the ratio of the amount of the dye (1-B) is somewhat smaller, the ozone resistance was somewhat poorer than the other Examples.

Example B6 (the total amount of dyes used in the coloring agent: 3%): This ink contains the dye (3) in an amount being 20% of the total amount of the dyes used in this example, the dye (3) having good solubility in water and good color developing properties. Thus, the ink could be stably ejected, and the developed color was excellent. Furthermore, the ink contains the dye (1-D), which has good ozone resistance and good light fastness, in an amount being 80% of the total amount of the dyes used in this example. Thus, the ozone resistance and the light fastness were excellent.

Example B7 (the total amount of dyes used in the coloring agent: 5%): This ink contains the dye (3) in an amount being 20% of the total amount of the dyes used in this example, the dye (3) having good solubility in water and good color developing properties. Thus, the ink could be stably ejected, and the developed color was excellent. Furthermore, the ink contains the dye (1-E), which has good ozone resistance and good light fastness, in an amount being 80% of the total amount of the dyes used in this example. Thus, the ozone resistance and the light fastness were excellent.

Comparative Example B1 (the total amount of dyes in the coloring agent: 4%): In this ink, only the dye (1-A) is employed. Thus, although the ozone resistance and light fastness were excellent, a problem arose with ejection stability. Furthermore, the developed color was unsatisfactory.

Comparative Example B2 (the total amount of dyes used in the coloring agent: 4%): This ink contains C. I. Acid Blue 9 in an amount being 20% of the total amount of the dyes used in this example, C. I. Acid Blue 9 having good solubility in water and good color developing properties. Thus, the ink could be stably ejected. However, C. I. Acid Blue 9 has poor ozone resistance and poor light fastness. Therefore, even when C. I. Acid Blue 9 was mixed with the dye (1-C), the ozone resistance and the light fastness were unsatisfactory.

Comparative Example B3 (the total amount of dyes used in the coloring agent: 4%): This ink contains C. I. Acid Blue 74 in an amount being 20% of the total amount of the dyes used in this example, C. I. Acid Blue 74 having good solubility in water. Thus, the ink could be stably ejected. However, because C. I. Acid Blue 74 having poor color developing properties was used in an amount being 20% of the total amount of the dyes, the developed color was unsatisfactory. Furthermore, C. I. Acid Blue 74 has poor ozone resistance and poor light fastness. Therefore, even when C. I. Acid Blue 74 was mixed with the dye (1-D), the ozone resistance and the light fastness were unsatisfactory.

Comparative Example B4 (the total amount of dyes in the coloring agents: 3%): In this ink, only the dye (3) is employed. Thus, the ink could be stably ejected, and the developed color was excellent. However, because the dye (3) has poor ozone resistance, the ozone resistance was unsatisfactory.

Comparative Example B5 (the total amount of dyes in the coloring agent: 3%): In this ink, only C. I. Acid Blue 9 is employed. Thus, the ink could be stably ejected, and the developed color was excellent. However, because C. I. Acid Blue 9 has poor ozone resistance and poor light fastness, the ozone resistance and light fastness were unsatisfactory.

Comparative Example B6 (the total amount of dyes in the coloring agent: 3%): In this ink, only C. I. Acid Blue 74 is employed. Thus, the ink could be stably ejected. However, C. I. Acid Blue 74 has poor color developing properties, poor ozone resistance and poor light fastness. Therefore, the color developing properties, ozone resistance and light fastness were unsatisfactory.

Example C1 (the total amount of dyes used in the coloring agent: 4%): This ink contains C. I. Direct Blue 86 in an amount being 3% of the total amount of the dyes used in this example, C. I. Direct Blue 86 having good solubility in water and good color developing properties. Thus, the ink could be stably ejected, and the developed color was excellent. Furthermore, the ink contains the dye (1-A), which has good ozone resistance and good light fastness, in an amount being 97% of the total amount of the dyes used in this example. Thus, the ozone resistance and the light fastness were excellent.

Example C2 (the total amount of dyes used in the coloring agent: 4%): This ink contains C. I. Direct Blue 86 in an amount being 7% of the total amount of the dyes used in this example, C. I. Direct Blue 86 having good solubility in water and good color developing properties. Thus, the ink could be stably ejected, and the developed color was excellent. Furthermore, the ink contains the dye (1-A), which has good ozone resistance and good light fastness, in an amount being 93% of the total amount of the dyes used in this example. Thus, the ozone resistance and the light fastness were excellent.

Example C3 (the total amount of dyes used in the coloring agent: 4%): This ink contains C. I. Direct Blue 86 in an amount being 20% of the total amount of the dyes used in this example, the dye (2-B) having good solubility in water and good color developing properties. Thus, the ink could be stably ejected, and the developed color was excellent. Furthermore, the ink contains the dye (1-B), which has good ozone resistance and good light fastness, in an amount being 80% of the total amount of the dyes used in this example. Thus, the ozone resistance and the light fastness were excellent.

Example C4 (the total amount of dyes used in the coloring agent: 4%): This ink contains C. I. Direct Blue 86 in an amount being 30% of the total amount of the dyes used in this example, C. I. Direct Blue 86 having good solubility in water and good color developing properties. Thus, the ink could be stably ejected, and the developed color was excellent. Furthermore, the ink contains the dye (1-C), which has good ozone resistance and good light fastness, in an amount being 70% of the total amount of the dyes used in this example. Thus, the ozone resistance and the light fastness were excellent.

Example C5 (the total amount of dyes used in the coloring agent: 4%): This ink contains C. I. Direct Blue 86 in an amount being 40% of the total amount of the dyes used in this example, C. I. Direct Blue 86 having good solubility in water and good color developing properties. Thus, the ink could be stably ejected, and the developed color was excellent. Furthermore, the ink contains the dye (1-B), which has good ozone resistance and good light fastness, in an amount being 60% of the total amount of the dyes used in this example. Thus, the ozone resistance and the light fastness were excellent. However, because the ratio of the amount of the dye (1-B) is somewhat smaller, the ozone resistance was somewhat poorer than the other Examples.

Example C6 (the total amount of dyes used in the coloring agent: 3%): This ink contains C. I. Direct Blue 86 in an amount being 20% of the total amount of the dyes used in this example, C. I. Direct Blue 86 having good solubility in water and good color developing properties. Thus, the ink could be stably ejected, and the developed color was excellent. Furthermore, the ink contains the dye (1-D), which has good ozone resistance and good light fastness, in an amount being 80% of the total amount of the dyes used in this example. Thus, the ozone resistance and the light fastness were excellent.

Example C7 (the total amount of dyes used in the coloring agent: 5%): This ink contains C. I. Direct Blue 86 in an amount being 20% of the total amount of the dyes used in this example, C. I. Direct Blue 86 having good solubility in water and good color developing properties. Thus, the ink could be stably ejected, and the developed color was excellent. Furthermore, the ink contains the dye (1-E), which has good ozone resistance and good light fastness, in an amount being 80% of the total amount of the dyes used in this example. Thus, the ozone resistance and the light fastness were excellent.

Comparative Example C1 (the total amount of dyes in the coloring agent: 4%): In this ink, only the dye (1-A) is employed. Thus, although the ozone resistance and light fastness were excellent, a problem arose with ejection stability. Furthermore, the developed color was unsatisfactory.

Comparative Example C2 (the total amount of dyes used in the coloring agent: 4%): This ink contains C. I. Acid Blue 9 in an amount being 20% of the total amount of the dyes used in this example, C. I. Acid Blue 9 having good solubility in water and good color developing properties. Thus, the ink could be stably ejected. However, C. I. Acid Blue 9 has poor ozone resistance and poor light fastness. Therefore, even when C. I. Acid Blue 9 was mixed with the dye (1-C), the ozone resistance and the light fastness were unsatisfactory.

Comparative Example C3 (the total amount of dyes used in the coloring agent: 4%): This ink contains C. I. Acid Blue 74 in an amount being 20% of the total amount of the dyes used in this example, C. I. Acid Blue 74 having good solubility in water. Thus, the ink could be stably ejected. However, because C. I. Acid Blue 74 having poor color developing properties was used in an amount being 20% of the total amount of the dyes, the developed color was unsatisfactory. Furthermore, C. I. Acid Blue 74 has poor ozone resistance and poor light fastness. Therefore, even when C. I. Acid Blue 74 was mixed with the dye (1-D), the ozone resistance and the light fastness were unsatisfactory.

Comparative Example C4 (the total amount of dyes in the coloring agents: 3%): In this ink, only C. I. Direct Blue 86 is employed. Thus, the ink could be stably ejected, and the developed color was excellent. However, because C. I. Direct Blue 86 has poor ozone resistance, the ozone resistance was unsatisfactory.

Comparative Example C5 (the total amount of dyes in the coloring agent: 3%): In this ink, only C. I. Acid Blue 9 is employed. Thus, the ink could be stably ejected, and the developed color was excellent. However, because C. I. Acid Blue 9 has poor ozone resistance and poor light fastness, the ozone resistance and light fastness were unsatisfactory.

Comparative Example C6 (the total amount of dyes in the coloring agent: 3%): In this ink, only C. I. Acid Blue 74 is employed. Thus, the ink could be stably ejected. However, C. I. Acid Blue 74 has poor color developing properties, poor ozone resistance and poor light fastness. Therefore, the color developing properties, ozone resistance and light fastness were unsatisfactory.

The entire disclosures of the specifications, claims and summaries of Japanese Patent Application Nos. 2006-38752, 2006-38756 and 2006-38758 filed on Feb. 16, 2006 are hereby incorporated by reference.

The invention claimed is:

1. A cyan ink for ink-jet recording, comprising a coloring agent, water and a water soluble organic solvent, wherein the coloring agent contains a dye (1) represented by the general formula (1) and at least one dye selected from the group consisting of a dye (2) represented by the general formula (2), a dye (3) represented by the general formula (3) and C. I. Direct Blue 86,

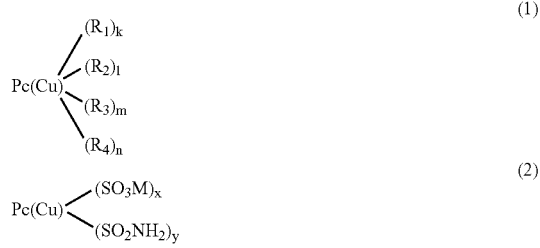

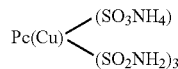

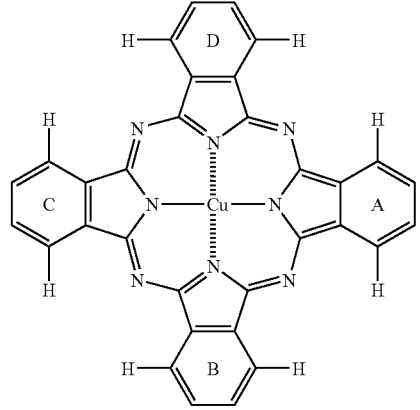

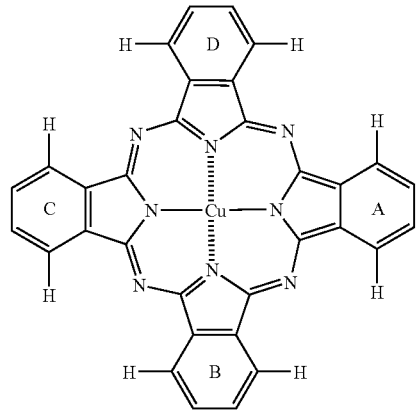

wherein, in the general formulas (1) to (3), Pc(Cu) represents a copper phthalocyanine nucleus represented by the general formula (4), wherein, in the general formula (1), k is a number satisfying $0 < k < 8$; l is a number satisfying $0 < l < 8$; m is a number satisfying $0 \leq m < 8$; n is a number satisfying $0 \leq n < 8$; k, l, m and n satisfy $4 \leq k+l+m+n \leq 8$; $R_1$, $R_2$, $R_3$ and $R_4$ each independently represent a substituent selected from the group consisting of $-SO_2-R_a$, $-SO_2NR_bR_c$ and $-CO_2-R_a$, provided that $R_1$, $R_2$, $R_3$ and $R_4$ are not simultaneously the same, that at least one of $R_1$, $R_2$, $R_3$ and $R_4$ has an ionic hydrophilic group as a substituent, and that at least one or more of $R_1$, $R_2$, $R_3$ and $R_4$ is present on each of four benzene rings A, B, C and D of the copper phthalocyanine nucleus represented by the general formula (4), wherein $R_a$ represents a substituted or unsubstituted alkyl group; $R_b$ represents a hydrogen atom, or a substituted or unsubstituted alkyl group; and $R_c$ represents a substituted or unsubstituted alkyl group, wherein, in the general formulas (2) and (3), each of an $SO_3M$ group, an $SO_2NH_2$ group and an $SO_3NH_4$ group is present on any of the four benzene rings A, B, C and D of the copper phthalocyanine nucleus represented by the general formula (4); M represents a monovalent metal cation selected from the group consisting of a lithium ion, a sodium ion and a potassium ion; x is a number satisfying 0<x<4; y is a number satisfying 0<y<4; and x and y satisfy 2≦x+y≦5.

2. The cyan ink for ink-jet recording according to claim 1, containing the dye (1) and the dye selected from the group consisting of the dye (2), the dye (3) and C. I. Direct Blue 86 in a ratio by weight of about 70:30 to about 95:5.

3. The cyan ink for ink-jet recording according to claim 1, wherein a total amount of the dye (1) and the dye selected from the group consisting of the dye (2), the dye (3) and C. I. Direct Blue 86 is about 1 wt % to about 5 wt % based on the total weight of the cyan ink.

4. The cyan ink for ink-jet recording according to claim 1, wherein, in the general formula (1), $R_1$, $R_2$, $R_3$ and $R_4$ are substituents represented by —$SO_2$—$R_a$, wherein $R_a$, is a substituted or unsubstituted alkyl group, provided that not all the four substituted or unsubstituted alkyl groups $R_a$ in $R_1$, $R_2$, $R_3$ and $R_4$ are completely identical.

5. The cyan ink for ink-jet recording according to claim 1, wherein, in the general formula (1), k is a number satisfying 0<k<4; l is a number satisfying 0<l<4; m is a number satisfying 0≦m<4; n is a number satisfying 0≦n<4; and the sum of k, l, m and n is 4.

6. The cyan ink for ink-jet recording according to claim 1, wherein, in the general formula (1), $R_1$ is a lithium sulfonato propylsulfonyl group; $R_2$ is an N-(2-hydroxypropyl) sulfamoylpropylsulfonyl group; k is 3; l is 1; and both m and n are 0.

7. The cyan ink for ink-jet recording according to claim 1, wherein, in the general formula (1), $R_1$ is a lithium sulfonato propylsulfonyl group; $R_2$ is an N-(2-hydroxyisopropyl) sulfamoylpropylsulfonyl group; k is 3; l is 1; and both m and n are 0.

8. The cyan ink for ink-jet recording according to claim 1, wherein, in the general formula (1), $R_1$ is a lithium sulfonato propylsulfonyl group; $R_2$ is an N,N-(di(2-hydroxyethyl)) sulfamoylpropylsulfonyl group; k is 3; l is 1; and both m and n are 0.

9. The cyan ink for ink-jet recording according to claim 1, wherein, in the general formula (1), $R_1$ is a lithium sulfonato propylsulfonyl group; $R_2$ is an N-(2-hydroxypropyl) sulfamoylpropylsulfonyl group; $R_3$ is an N-(2-hydroxyisopropyl) sulfamoylpropylsulfonyl group; k is 2; l is 1; m is 1; and n is 0.

10. The cyan ink for ink-jet recording according to claim 1, wherein, in the general formula (1), $R_1$ is a lithium sulfonato propylsulfonyl group; $R_2$ is a lithium carboxylato propylsulfonyl group; $R_3$ is an N-(2-hydroxypropyl) sulfamoylpropylsulfonyl group; $R_4$ is an N-(2-hydroxyisopropyl) sulfamoylpropylsulfonyl group; and k, l, m and n are 1.

11. The cyan ink for ink-jet recording according to claim 1, wherein, in the general formula (2), x is a number satisfying 0<x<4; y is a number satisfying 0<y<4; and the sum of x and y is 4.

12. The cyan ink for ink-jet recording according to claim 1, wherein, in the general formula (2), M is a sodium ion; x is 1; y is 3; and one substituent is present on each of the four benzene rings A, B, C and D of the copper phthalocyanine nucleus represented by the general formula (4).

13. The cyan ink for ink-jet recording according to claim 1, wherein, in the general formula (2), M is a sodium ion; both x and y are 2; and one substituent is present on each of the four benzene rings A, B, C and D of the copper phthalocyanine nucleus represented by the general formula (4).

14. The cyan ink for ink-jet recording according to claim 1, wherein, in the general formula (2), M is a sodium ion; x is 3; y is 1; and one substituent is present on each of the four benzene rings A, B, C and D of the copper phthalocyanine nucleus represented by the general formula (4).

* * * * *

UNITED STATES PATENT AND TRADEMARK OFFICE
CERTIFICATE OF CORRECTION

PATENT NO.        : 7,425,233 B2                                         Page 1 of 1
APPLICATION NO. : 11/673932
DATED             : September 16, 2008
INVENTOR(S)       : Tomoyo Hamajima et al.

It is certified that error appears in the above-identified patent and that said Letters Patent is hereby corrected as shown below:

In Column 26, Claim 1, Lines 25-40:
  Please delete the duplicate structure (4)

Signed and Sealed this

Eleventh Day of August, 2009

David J. Kappos
*Director of the United States Patent and Trademark Office*